United States Patent
Naschke et al.

[15] 3,644,091
[45] Feb. 22, 1972

[54] CLARIFICATION OF PHOSPHORIC ACID

[72] Inventors: John H. Naschke; Robert L. Taylor, both of Houston, Tex.

[73] Assignee: Esso Research and Engineering Company

[22] Filed: Mar. 17, 1970

[21] Appl. No.: 20,181

[52] U.S. Cl..................................................23/165, 210/54
[51] Int. Cl.....................................C01b 25/18, C01b 25/22
[58] Field of Search ..............23/165, 165 B, 312 D; 210/54; 209/5

[56] References Cited

UNITED STATES PATENTS

| | | | |
|---|---|---|---|
| 2,955,919 | 10/1960 | Wilson | 23/165 |
| 3,009,873 | 11/1961 | Kerr et al. | 210/53 |
| 3,300,407 | 1/1967 | Priesing et al. | 210/54 |

FOREIGN PATENTS OR APPLICATIONS

| | | | |
|---|---|---|---|
| 967,607 | 8/1964 | England | 210/54 |

Primary Examiner—Earl C. Thomas
Assistant Examiner—Gregory A. Heller
Attorney—Thomas B. McCulloch, Melvin F. Fincke, John S. Schneider, Sylvester W. Brock, Jr., Kurt S. Myers and Timothy L. Burgess

[57] ABSTRACT

Phosphoric acid in a wet phosphoric acid process is clarified by introducing into the acid a small but effective amount of a clarification additive which is a sulfonated polystyrene or a water soluble salt thereof having a molecular weight from about 1 to about 40 million and sulfonated in the para-position in the benzene ring in an amount of about 1 to 3 moles per mole of benzene ring, the clarification additive being added to the acid in one or more zones of the process.

13 Claims, 2 Drawing Figures

CLARIFICATION OF PHOSPHORIC ACID

BACKGROUND OF THE INVENTION

1. Field of the Invention

The present invention is directed to clarification of phosphoric acid. More particularly, the invention is concerned with clarification of phosphoric acid by flocculation or coagulation of solids. In its more specific aspects, the invention is concerned with clarification of phosphoric acid in a wet process in which phosphate rock is treated with sulfuric acid and the resulting acid is clarified by addition of a particular clarification additive.

2. Prior Art

Polyelectrolytes or polymer coagulants known to the art such as polysaccharides, leguminous seed derivatives, polyacrylamides, polyacrylonitriles, polyacrylic acid and salts thereof, compounds containing polyamide and carboxylic groups, polyamines, polyethylene oxide, algin and its salts, sodium carboxymethylcellulose, starch derivatives, sulfonated polyacrylamide and its sodium salts, mixtures thereof have been found to be noneffective in coagulating dispersed solids in the wet phosphoric acid process, which process is well known. However, it has now been found that sulfonated polystyrene sulfonated in the paraposition of the benzene ring in an amount of about 1 to about 3 moles per mole of benzene ring and having a molecular weight within the range of about 1 to about 40 million effectively coagulates solids in the wet phosphoric acid process and clarifies the phosphoric acid. The water-soluble salts such as the alkali metal salts of the sulfonated polystyrene also are effective.

SUMMARY OF THE INVENTION

The present invention may be briefly described and summarized as involving the introduction of a clarification additive into the acid in one or more of the zones of a wet phosphoric acid process. Thus, the clarification additive which is a sulfonated polystyrene or a water soluble salt thereof having a molecular weight within the range of about 1 to about 40 million may be introduced into the digestion zone, the acid introduced into the evaporation zone or into the acid leaving the evaporation zone and introduced into a centrifugation zone or into the acid leaving the centrifugation zone or into the storage zone. The clarification additive may be introduced directly into the zones or into the phosphoric acid in or introduced into the zones. It may be introduced into one or all of the zones or it may be introduced incrementally into one or more zones.

VARIABLES OF THE INVENTION

The clarification additive employed in the present invention is sulfonated polystyrene which has a high molecular weight in the range between about 1 million and about 40 million, preferably above about 3 million and in the range up to about 12 million. The water soluble salts of the sulfonated polystyrene having molecular weights in the ranges given may also be used and include the alkali metal salts such as sodium, potassium and lithium salts with the sodium salt being preferred over the other salts. The sulfonated polystyrene and its water soluble salts are sulfonated in the paraposition of the benzene ring with a degree of sulfonation of about 1 mole per mole benzene ring. Sulfonated polystyrene of about 6 million molecular weight give desirable results.

The clarification additive may be added in an amount within the range from about 10 to about 200 p.p.m. of the phosphoric acid to be clarified. This amount may be added incrementally to at least one zone or may be added to several zones of the wet phosphoric acid process either directly or to the phosphoric acid introduced into the zones. Thus, the clarification additive may be added directly to the digestion zone or to the acid introduced to or into the clarification zone, the evaporation zone, or the centrifugation zone, or after the centrifugation zone, or to all zones as may be desired.

A foam inhibitor may be used in conjunction with the clarification agent and also introduced into one or more zones of the wet phosphoric acid process. A preferred foam inhibitor may be a homogeneous mixture of polyoxyethylene sorbitan ester of a fatty acid and a fatty acid. The fatty acid may be tall oil fatty acid. However, other foam inhibitors may be used such as but not limited to sodium stearate and petroleum based pure oil.

The conditions employed in the digestion zone of the system of the present invention include a temperature within the range of 70° to about 85° C. with a preferred temperature of about 75° C. The temperature in the flash cooler and filter zone may range from about 60° to 70° C. dependent on the temperature in the digestion zone. In the clarification zone the temperature may range from about 60° to about 70° C. with a preferred temperature of about 60° to about 63° C. In the multiple stage evaporators, the pressure may range from about 2 to 8 inches of mercury and temperatures from 80° to 85° C. Temperatures in the centrifugation zone may range from about 80° to about 85° C.

The phosphoric acid may contain from about 0.5 percent to about 30 percent by wt. of solids. Effective clarification has been obtained with phosphoric acid containing from about 2 to about 27 percent by wt. of solids.

BRIEF DESCRIPTION OF THE DRAWING

The present invention will be further illustrated by the drawing in which.

DESCRIPTION OF THE PREFERRED MODE AND EMBODIMENTS WITH RESPECT TO THE DRAWING

Figure 1:
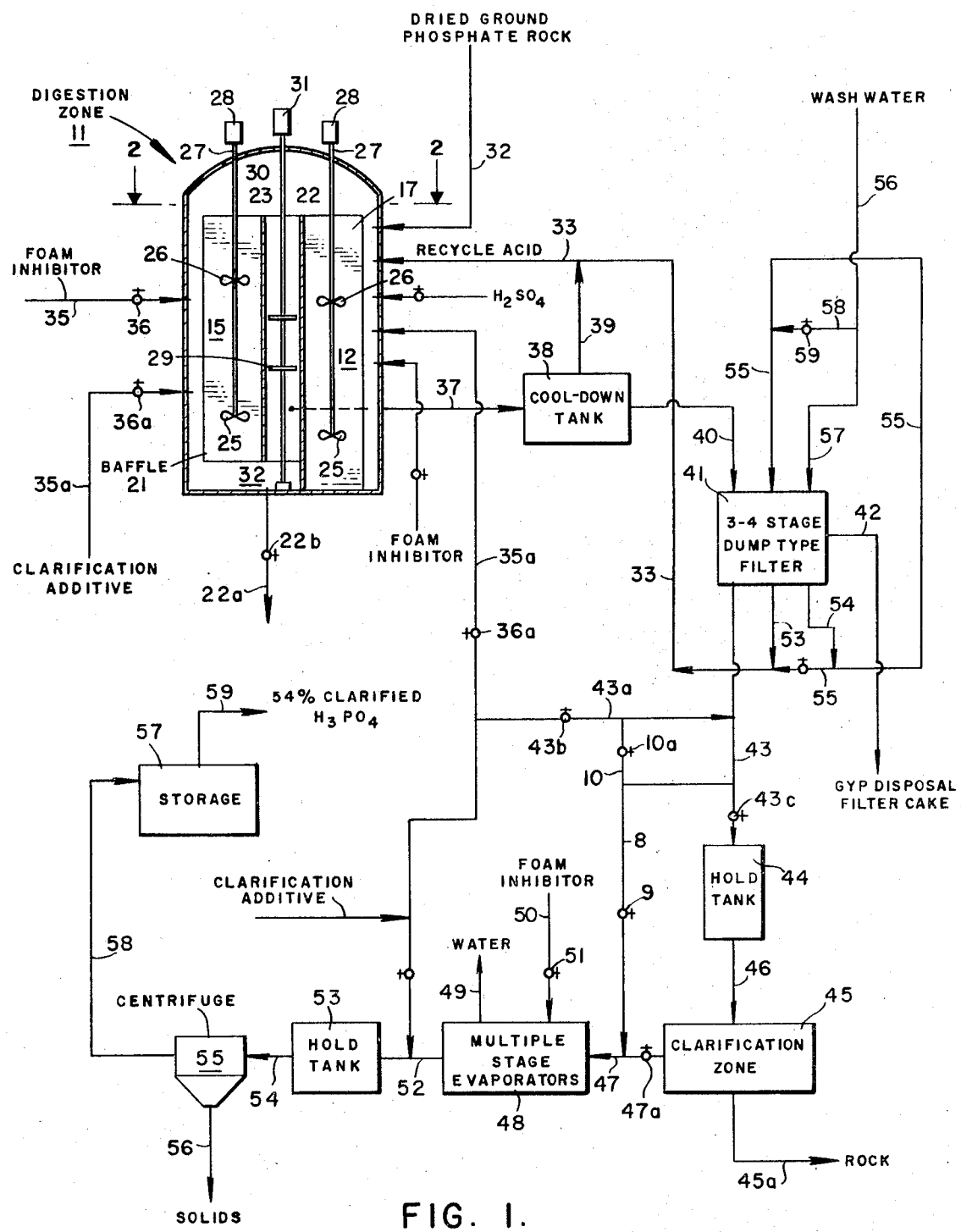
FIG. 1 is a flow diagram of a preferred mode and embodiment.
Figure 2:
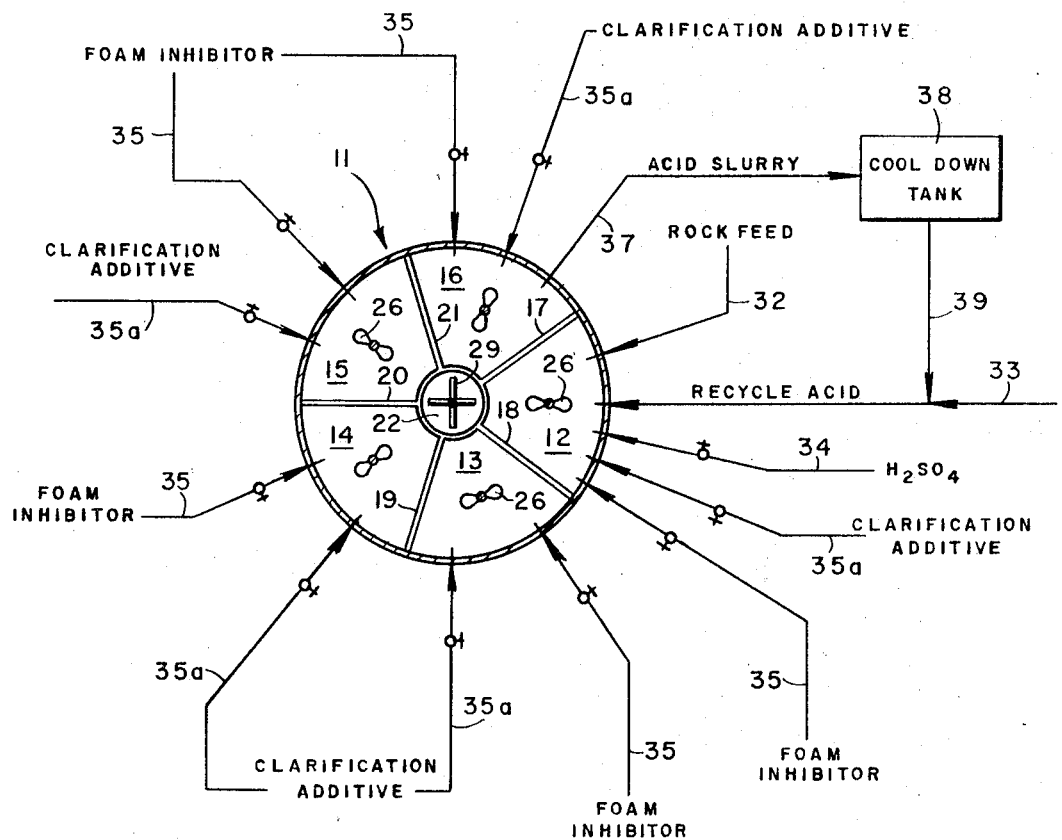
FIG. 2 is a view of FIG. 1 taken along the lines 2—2.

Referring now to the drawing and particularly to FIGS. 1 and 2, numeral 11 designates a digestion zone comprised of a plurality of stages 12, 13, 14, 15 and 16 defined by baffles 17, 18, 19, 20 and 21. A circular well 22 is formed by cylindrical wall member 23. Each of the stages 12, 13, 14, 15 and 16 is provided with agitating means 24 provided with stirring means 25 and 26 arranged on shafts 27 actuated by prime movers such as electrical motors 28. The circular well 22 is also provided with an agitating means 29 arranged on a shaft 30 and driven by prime mover 31. Introduced in the stage 12 by conduit 32 is dried, ground phosphate rock from a source not shown and having a typical composition such as set out in Table I.

TABLE I

Analysis of Acidulation-Grade Phosphate Rock Samples
Florida Rock

|  | Average % |
| --- | --- |
| $P_2O_5$ | 34.42 |
| $SiO_2$ | 5.08 |
| CaO | 49.44 |
| $Al_2O_3$ | 0.737 |
| $Fe_2O_3$ | 0.765 |
| MnO | 0.03 |
| MgO | 0.19 |
| $K_2O$ | 0.05 |
| $Na_2O$ | 0.35 |
| F | 3.52 |
| $CO_2$ | 3.41 |
| Ign. loss—900° C. | 5.42 |
| Total S as $SO_3$ | 0.84 |
| Sulfonate as $SO_3$ | 0.76 |
| $H_2O$ | 0.87 |
|  | 101.48 |
| Oxygen≈F | −1.48 |
|  | 100.00 |

This analysis has been adjusted to 100 percent. It is understood that other phosphate rock may be used.

The stages 12, 13, 14, 15 and 16 formed by baffles 17, 18, 19, 20 and 21 are formed such that the rock slurry may proceed from one stage to the other; thus, baffle 12 reaches to the bottom of digestion zone 11 while the baffle plate 21 provides a passageway such as 32 from stage 15 to 16. Thus, baffle 18 would be like baffle 21, etc. Where a baffle reaches to the bottom of zone 11, the slurry overflows into the next stage. Leading into stage 12 is recycle acid by way of line 33 from a source which will be described further. Sulfuric acid having a strength in the range from 54 to 95% $H_2SO_4$ is introduced by line 34 and foam inhibitor is introduced into the several stages by lines 35 controlled by valves 36. The clarification additive of the present invention is introduced into the several stages by lines 35a controlled by valves 36a. Inasmuch as the clarification additive is effective in the digestion zone 11, means such as line 22a controlled by valve 22b is provided for removing any rock or solids which are flocculated in zone 11. The resulting acid slurry is withdrawn from stage 16 by line 37 and discharged thereby into a cool down tank 38 where the temperature is suitably reduced to a temperature in the range given before. Recycle acid is withdrawn from cool down tank 38 by line 33 as has been described. Acid is also withdrawn and introduced into line 33 by branch line 39 which connects to cool down tank 38. The cooled acid discharges from cool down tank 38 by line 40 and is introduced thereby into a 3 to 4 stage dump-type filter zone 41 where phosphoric acid is separated from the gyp filter cake and the filter cake is withdrawn by line 42 for further treatment and disposal.

Acids of various concentrations are withdrawn from the several stages of filter zone 41. Thus, the strongest acid is withdrawn by line 42 into a hold tank 44 and thence into a clarification zone 45 by line 46. Clarification additive is introduced into line 43 by line 43a controlled by valve 43b. The acid stream contains rock which is separated from the acid in clarification zone 45 and disposed of by withdrawing same by line 45A. The clarified acid is then introduced by line 47 into a multiple stage evaporator 48 operating at a suitable temperature and reduced pressure to remove water by line 49; foam inhibitor may be added by line 50 controlled by valve 51. Phosphoric acid at a concentration of about 54 percent by weight is recovered by line 52.

Alternatively, hold tank 45 and zone 46 may be bypassed. This may be done by closing valve 43c in line 43 and allowing the acid in line 43 to flow by line 8 controlled by valve 9 directly to line 47. Under these circumstances the additive from line 43a will flow into line 8 through bypass line 10 controlled by valve 10a. When tank 45 and zone 46 are bypassed, valve 47a in line 47 is closed.

Weaker acid is discharged from filter zone 41 by lines 53 and 54. The weaker acid withdrawn by line 53 may be introduced into line 33 to form the recycle acid. This acid has a strength of about 10–15% $H_3PO_4$, while the still weaker acid of about 5% $H_3PO_4$ withdrawn by line 54 may be recycled to filter zone 41 by line 55. Wash water may be introduced into filter zone 41 by line 56 which connects to branch line 57 and by line 58 controlled by valve 59 into line 55.

The phosphoric acid recovered by line 52 is discharged into a hold tank 53 and from thence it is introduced by line 54 into centrifuge zone 55 where additional solids are removed and the 54% acid further clarified. These solids are discharged from zone 55 by line 56. The clarified acid is then sent to storage by line 58 and may be withdrawn for use by line 59. In storage 57 any solids not removed in zone 55 may settle out and further clarify the acid. From time to time, therefore, deposits of solids and sediment, if any, in tank 57 may be removed by means not shown.

It will be seen by reference to the drawing that a process has been provided for clarification of acid produced in a wet phosphoric acid process by injecting a particular clarification additive into one or more stages of the digestion zone and/or into acid introduced into the evaporation zone or into the centrifugation zone.

In order to illustrate the invention further, the following specific examples are given:

EXAMPLES

I

Five hundred parts of filtered 35% phosphoric acid containing about 26 percent by wt. of solids were introduced into a vessel suitable for heating under reduced pressure while mixing. The phosphoric acid was heated to an evaporation temperature of about 215° F. at atmospheric pressure, and 25 p.p.m. of clarification additive (sulfonated polystyrene having a molecular weight of about 6 million) added. A reduced pressure of 260 mm. mercury was applied while mixing the contents of the vessel and the acid was concentrated to 54% $H_3PO_4$. The pressure was raised to atmospheric pressure and a second increment of 25 p.p.m. of the same clarification additive added and mixed for about 30 seconds. The treated acid was then centrifuged. It was found that the phosphoric acid recovered after centrifuging contained only 0.35 percent by wt. of solids as compared with phosphoric acid of comparable strength which had not been treated in accordance with the present invention and which contained 1.3 percent solids.

II

In another operation, 53% $H_3PO_4$ containing 3.8 percent by wt. solids with no clarification additive was centrifuged and found to contain 1.3 percent by wt. solids, no additive being employed.

III

In still another operation, 53% $H_3PO_4$ containing 2.74 percent by wt. of solids had 50 p.p.m. of clarification additive (sulfonated polystyrene) of 12 million mol. wt. added. The acid was then centrifuged and the clarified acid was found to contain only 0.35 percent by wt. of solids.

IV

In this example, 30% $H_3PO_4$ in the digestion zone of a wet phosphoric acid process was found to contain 25 percent by wt. of solids. Fifty p.p.m. of clarification additive was added to the acid from the digestion zone and after filtration the 54 percent acid recovered therefrom after evaporation was found to contain only 0.12 percent by wt. solids. The clarification additive was sulfonated polystyrene of 12 million mol. wt.

It is apparent from the several examples where the sulfonated polystyrene was used, unobvious results were obtained in removing solids and providing an acid substantially free of solids which transmitted light freely. The clarified acid had a pale straw color. The invention is, therefore, quite useful since solids-free acid is more desirable than that containing suspended or dispersed solids.

The nature and objects of the present invention having been fully described and illustrated and the best mode contemplated set forth what we wish to claim as new and useful and secure by Letters Patent is:

1. In a wet process for producing clarified phosphoric acid from phosphate rock by reaction of said rock with sulfuric acid having a rock digestion zone, an evaporation zone, and having at least a centrifuge zone or a storage zone which comprises:

introducing into the acid in at least one of said zones an effective amount within the range from about 10 to about 200 p.p.m. based on said acid of a clarification additive selected from the group consisting of sulfonated polystyrene and its water soluble salts having a molecular weight within the range of about 1 million to about 40 million and sulfonated in the para-position of the benzene ring in an amount of about 1 to about 3 moles per mole of benzene ring; and removing solids from said acid containing said additive.

2. A process in accordance with claim 1 in which the clarification additive has a molecular weight within the range of about 3 million to about 12 million.

3. A process in accordance with claim 1 in which the clarification additive has a molecular weight of about 6 million.

4. A process in accordance with claim 1 in which the clarification additive is introduced into the digestion zone.

5. A process in accordance with claim 1 in which the clarification additive is introduced into the acid introduced into the evaporation zone.

6. A process in accordance with claim 1 in which the clarification additive is introduced into the acid discharged from the evaporation zone into the centrifuge zone.

7. A process in accordance with claim 1 in which the clarification additive is sulfonated polystyrene of a molecular weight of about 3 to about 12 million.

8. A process in accordance with claim 1 in which the clarification additive is introduced into the acid in the storage zone.

9. A process in accordance with claim 1 in which the clarification additive is introduced into each of said zones.

10. A process in accordance with claim 9 in which the amount of clarification additive is introduced in increments.

11. A process in accordance with claim 10 in which the clarification additive is introduced into each of said zones.

12. A process in accordance with claim 1 in which:
   a. the molecular weight of the clarification additive is within the range of about 3 to 12 million;
   b. the clarification additive is introduced in increments; and
   c. the clarification additive is sulfonated polystyrene.

13. In the clarification of phosphoric acid containing suspended solids, the steps of clarifying said acid which comprises:

adding to said phosphoric acid an effective amount within the range from about 10 to about 200 p.p.m. based on said acid of a clarification additive selected from the group consisting of sulfonated polystyrene and its water soluble salts having a molecular weight within the range of about 1 million to about 40 million and sulfonated in the paraposition of the benzene ring in an amount of about 1 to about 3 moles per mole of benzene ring; and removing solids from said phosphoric acid containing said additive.

* * * * *